(12) United States Patent
Tsou et al.

(10) Patent No.: US 12,483,146 B2
(45) Date of Patent: Nov. 25, 2025

(54) PRIMARY-CONTROLLER WITH VOLTAGE COMPENSATION FUNCTION AND OPERATIONAL METHOD THEREOF

(71) Applicant: Leadtrend Technology Corp., Hsinchu County (TW)

(72) Inventors: Ming-Chang Tsou, Hsinchu County (TW); Meng-Jen Tsai, Hsinchu County (TW); Ming-Yen Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 201 days.

(21) Appl. No.: 18/518,610

(22) Filed: Nov. 24, 2023

(65) Prior Publication Data

US 2024/0405684 A1    Dec. 5, 2024

(30) Foreign Application Priority Data

May 31, 2023   (TW) ................................ 112120293

(51) Int. Cl.
*H02M 3/335*   (2006.01)
*H02M 1/00*    (2006.01)
*H02M 1/08*    (2006.01)
*H02M 1/088*   (2006.01)

(52) U.S. Cl.
CPC ..... *H02M 3/33569* (2013.01); *H02M 1/0048* (2021.05); *H02M 1/08* (2013.01); *H02M 1/088* (2013.01); *H02M 3/33507* (2013.01)

(58) Field of Classification Search
CPC .. H02M 3/33569; H02M 1/0048; H02M 1/08; H02M 1/088; H02M 3/33507
See application file for complete search history.

(56) References Cited

U.S. PATENT DOCUMENTS

| | | | |
|---|---|---|---|
| 9,564,814 B2 * | 2/2017 | Lu | H02M 3/33523 |
| 9,948,187 B2 * | 4/2018 | Gong | H02M 3/33507 |
| 10,075,073 B2 * | 9/2018 | Guan | G05F 1/46 |
| 10,897,206 B2 * | 1/2021 | Tao | H02M 3/33523 |
| 2004/0257833 A1 * | 12/2004 | Yang | H02M 3/33507 363/16 |
| 2005/0024898 A1 * | 2/2005 | Yang | H02M 3/33507 363/21.12 |
| 2005/0146903 A1 * | 7/2005 | Yang | H02M 3/33507 363/21.15 |

(Continued)

*Primary Examiner* — Yusef A Ahmed
(74) *Attorney, Agent, or Firm* — Winston Hsu

(57) ABSTRACT

A primary-controller with voltage compensation function applied to a primary side of a power converter includes a gate control signal generation circuit, and the gate control signal generation circuit includes a clamping unit and a driving unit. The gate control signal generation circuit is coupled to a power switch installed in the primary side of the power converter, and is used for enabling a gate control signal, wherein the gate control signal is used for making the power switch turned on. The clamping unit generates a compensation voltage according to a clamping voltage. The driving unit is coupled between the clamping unit and a gate of the power switch, and used for generating the gate control signal according to the compensation voltage. The clamping voltage is changed with a detection voltage of a detection resistor coupled to the power switch accordingly.

11 Claims, 12 Drawing Sheets

(56) References Cited

U.S. PATENT DOCUMENTS

| | | | | |
|---|---|---|---|---|
| 2008/0116955 | A1* | 5/2008 | Chen | H03K 17/26 |
| | | | | 327/434 |
| 2008/0231207 | A1* | 9/2008 | Kimura | H05B 41/3927 |
| | | | | 315/276 |
| 2010/0002480 | A1* | 1/2010 | Huynh | H02M 3/335 |
| | | | | 363/90 |
| 2011/0157923 | A1* | 6/2011 | Ren | H02M 3/33507 |
| | | | | 363/21.12 |
| 2012/0281434 | A1* | 11/2012 | Lin | H02M 3/3376 |
| | | | | 363/21.02 |
| 2014/0043876 | A1* | 2/2014 | Tsou | H02M 3/33507 |
| | | | | 363/78 |
| 2014/0062322 | A1* | 3/2014 | Yu | H05B 45/3725 |
| | | | | 315/200 R |
| 2014/0211511 | A1* | 7/2014 | Tsai | H02M 3/33523 |
| | | | | 363/15 |
| 2015/0029763 | A1* | 1/2015 | Shen | H02M 3/33523 |
| | | | | 363/21.18 |
| 2016/0285376 | A1* | 9/2016 | Tsou | H02M 3/33523 |
| 2019/0104589 | A1* | 4/2019 | Wang | H05B 45/385 |
| 2020/0212811 | A1* | 7/2020 | Lin | H02M 3/33523 |
| 2021/0257920 | A1* | 8/2021 | Cheng | H02M 3/33523 |
| 2024/0014727 | A1* | 1/2024 | Kikuchi | H02M 1/08 |
| 2024/0063706 | A1* | 2/2024 | Tsou | H02M 3/33507 |
| 2024/0113622 | A1* | 4/2024 | Yokoyama | H02M 1/0025 |
| 2024/0213967 | A1* | 6/2024 | Moore | H02M 1/0025 |
| 2024/0349408 | A1* | 10/2024 | Xu | H05B 45/50 |

\* cited by examiner

PRIMARY-CONTROLLER WITH VOLTAGE COMPENSATION FUNCTION AND OPERATIONAL METHOD THEREOF

BACKGROUND OF THE INVENTION

1. Field of the Invention

The present relates to a primary-controller with voltage compensation function and an operational method thereof, and particularly to a primary-controller and an operational method thereof that can make a power switch of a power converter still operate in a saturation region when a detection voltage is changed dynamically.

2. Description of the Prior Art

In the prior art, when a power switch installed in a primary side of a flyback power converter is turned on (i.e. the primary side of the flyback power converter is conducted), a primary-side current flowing through the power switch is gradually increased from zero. Because a detection voltage determined by a detection resistor coupled to a source of the power switch and the primary-side current is also gradually increased from zero, a source voltage on the source of the power switch is also gradually increased from zero. At this time, if a voltage level of a gate control signal applied to a gate of the power switch is not changed, a gate-source voltage of the power switch is gradually reduced, resulting in operation of the power switch leaving a saturation region and entering a triode region. Thus, conversion efficiency of the flyback power converter will be reduced.

Therefore, how to solve the above-mentioned problems in the prior art has become an important issue for a designer of the primary-controller applied to the primary side of the flyback power converter.

SUMMARY OF THE INVENTION

An embodiment of the present invention provides a primary-controller with voltage compensation function, wherein the primary-controller is applied to a primary side of a power converter. The primary-controller includes a gate control signal generating circuit, and the gate control signal generating circuit includes a clamping unit and a driving unit. The gate control signal generating circuit is coupled to a power switch installed in the primary side of the power converter, wherein the gate control signal generating circuit is used for enabling a gate control signal, the gate control signal is used for making the power switch turned on. The clamping unit is used for generating a compensation voltage according to a clamping voltage. The driving unit is coupled between the clamping unit and a gate of the power switch, wherein the driving unit is used for generating the gate control signal according to the compensation voltage, the clamping voltage is changed with a detection voltage of a detection resistor accordingly, and the detection resistor is coupled to the power switch.

Another embodiment of the present invention provides a primary-controller with voltage compensation function, wherein the primary-controller is applied to a primary side of a power converter. The primary-controller includes a gate control signal generating circuit, and the gate control signal generating circuit includes a clamping unit and a driving unit. The gate control signal generating circuit is coupled to a power switch installed in the primary side of the power converter, wherein the gate control signal generating circuit is used for enabling a gate control signal, the gate control signal is used for making the power switch turned on. The clamping unit is used for generating a compensation voltage according to a clamping voltage. The driving unit is coupled between the clamping unit and a gate of the power switch, wherein the driving unit is used for generating the gate control signal according to the compensation voltage, and the clamping voltage is changed with a DC input voltage of the primary side of the power converter accordingly.

Another embodiment of the present invention provides an operational method of a primary-controller with voltage compensation function, wherein the primary-controller is applied to a primary side of a power converter, the primary-controller includes a gate control signal generating circuit, and the gate control signal generating circuit includes a clamping unit and a driving unit. The operational method includes the clamping unit generating a compensation voltage according to a clamping voltage; and the driving unit generating a gate control signal according to the compensation voltage, wherein the gate control signal is used for making a power switch installed in the primary side of the power converter turned on, the clamping voltage is changed with a detection voltage of a detection resistor accordingly, and the detection resistor is coupled to the power switch.

Another embodiment of the present invention provides an operational method of a primary-controller with voltage compensation function, wherein the primary-controller is applied to a primary side of a power converter, the primary-controller includes a gate control signal generating circuit, and the gate control signal generating circuit includes a clamping unit and a driving unit. The operational method includes the clamping unit generating a compensation voltage according to a clamping voltage; and the driving unit generating a gate control signal according to the compensation voltage, wherein the clamping voltage is changed with a DC input voltage of the primary side of the power converter accordingly.

The present invention provides a primary-controller with voltage compensation function and an operational method thereof. Because the primary-controller and the operational method thereof can make a voltage level of a gate control signal applied to a power switch of a primary side of a power converter changed with a detection voltage, a gate-source voltage of the power switch is not reduced with increase of the detection voltage accordingly. Therefore, compared with the prior art, when the detection voltage is changed dynamically, the power switch can still operate in a saturation region, so conversion efficiency of the power converter will not be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
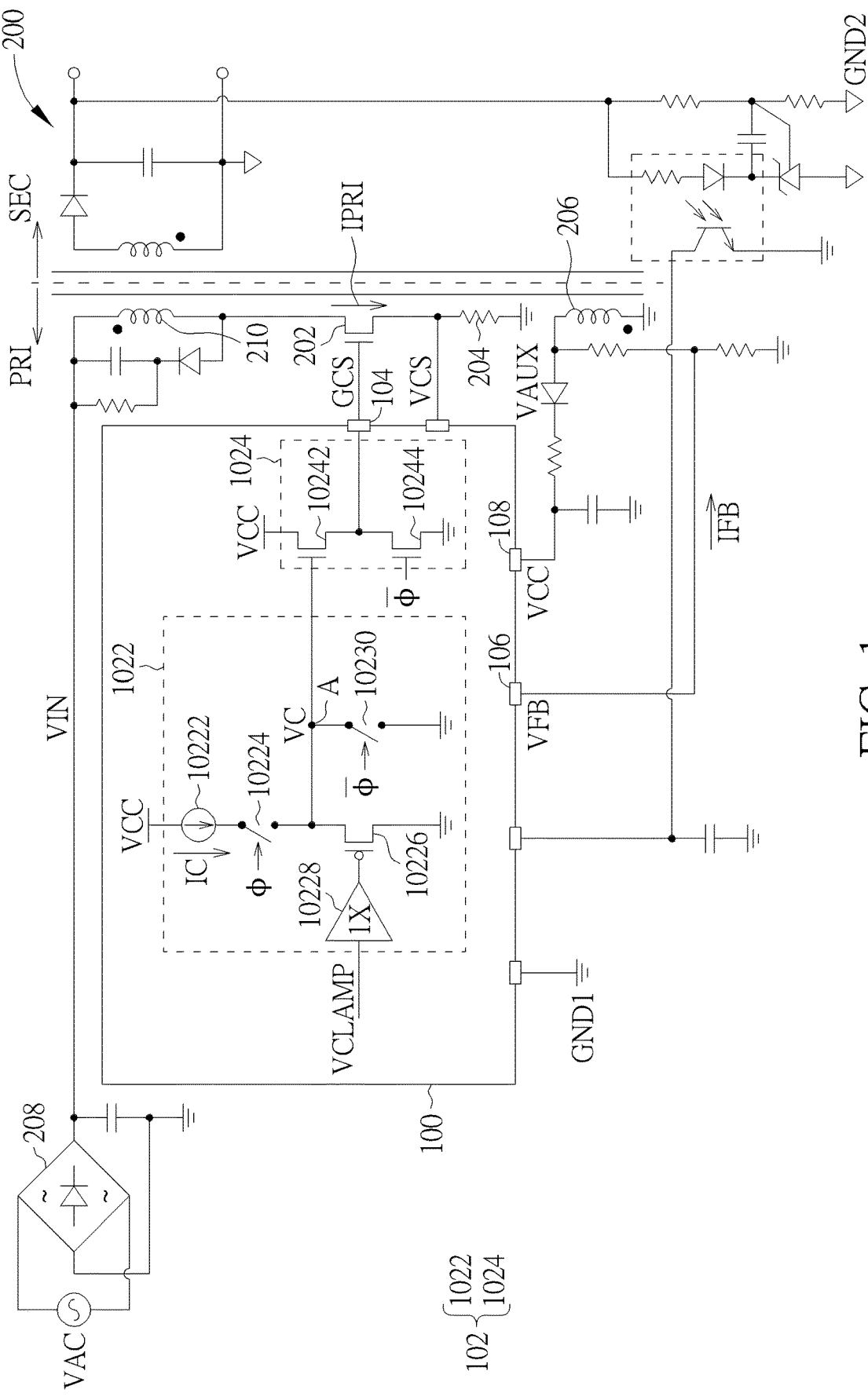
FIG. 1 is a diagram illustrating of a primary-controller with a voltage compensation function according to a first embodiment of the present invention.

Please refer to FIG. 1. FIG. 1 is a diagram illustrating of a primary-controller 100 with a voltage compensation function according to a first embodiment of the present invention, wherein the primary-controller 100 is applied to a primary side PRI of a power converter 200, and the power converter 200 is a flyback power converter. As shown in FIG. 1, the primary-controller 100 at least includes a gate control signal generating circuit 102, the gate control signal generating circuit 102 is coupled to a power switch 202 installed in the primary side PRI of the power converter 200 and used for enabling a gate control signal GCS, wherein the gate control signal GCS is transmitted to a gate of the power switch 202 through a pin 104 of the primary-controller 100, and the gate control signal GCS is used for making the power switch 202 turned on.

As shown in FIG. 1, the gate control signal generating circuit 102 includes a clamping unit 1022 and a driving unit 1024, wherein the driving unit 1024 is coupled between the clamping unit 1022 and the gate of the power switch 202. The clamping unit 1022 includes a current source 10222, a first switch 10224, a p-type metal-oxide-semiconductor transistor 10226, an amplifier 10228, and a second switch 10230. The current source 10222 has a first terminal and a second terminal, wherein the first terminal of the current source 10222 receives a first voltage VCC, and the current source 10222 is used for providing a charging current IC. The first switch 10224 has a first terminal, a second terminal, and a control terminal, wherein the first terminal of the first switch 10224 is coupled to the second terminal of the current source 10222, the control terminal of the first switch 10224 receives a control signal φ, and the control signal φ corresponds to turning-on time of the power switch 2022. The p-type metal-oxide-semiconductor transistor 10226 has a first terminal, a second terminal, and a third terminal, wherein the first terminal of the p-type metal-oxide-semiconductor transistor 10226 is coupled to the second terminal of the first switch 10224, the third terminal of the p-type metal-oxide-semiconductor transistor 10226 receives a second voltage GND1, the first voltage VCC is greater than the second voltage GND1, and the second voltage GND1 is different from a ground potential GND2 of a secondary side SEC of the power converter 200. The amplifier 10228 has an input terminal and an output terminal, wherein the output terminal of the amplifier 10228 is coupled to the second terminal of the p-type metal-oxide-semiconductor transistor 10226, and the input terminal of the amplifier 10228 receives a clamping voltage VCLAMP. The second switch 10230 has a first terminal, a second terminal, and a control terminal, wherein the first terminal of the second switch 10230 is coupled to the second terminal of the first switch 10224 and the first terminal of the p-type metal-oxide-semiconductor transistor 10226, the control terminal of the second switch 10230 receives an inverted control signal $\bar{\phi}$, the second terminal of the second switch 10230 receives the second voltage GND1, and the inverted control signal $\bar{\phi}$ is inverted with the control signal φ.

As shown in FIG. 1, the driving unit 1024 includes a first n-type metal-oxide-semiconductor transistor 10242 and a second n-type metal-oxide-semiconductor transistor 10244. The first n-type metal-oxide-semiconductor transistor 10242 has a first terminal, a second terminal, and a third terminal, wherein the first terminal of the first n-type metal-oxide-semiconductor transistor 10242 receives the first voltage VCC, the second terminal of the first n-type metal-oxide-semiconductor transistor 10242 is coupled to the clamping unit 1022 for receiving a compensation voltage VC, and the third terminal of the first n-type metal-oxide-semiconductor transistor 10242 is coupled to the gate of the power switch 202, wherein the first n-type metal-oxide-semiconductor transistor 10242 generates the gate control signal GCS according to the compensation voltage VC. The second n-type metal-oxide-semiconductor transistor 10244 has a first terminal, a second terminal, and a third terminal, wherein the first of terminal the second n-type metal-oxide-semiconductor transistor 10244 is coupled to the third terminal of the first n-type metal-oxide-semiconductor transistor 10242, the second the terminal of second n-type metal-oxide-semiconductor transistor 10244 receives the inverted control signal $\bar{\phi}$, and the third terminal of the second n-type metal-oxide-semiconductor transistor 10244 receives the second voltage GND1.

As shown in FIG. 1, when the inverted control signal $\bar{\phi}$ is enabled (the control signal φ is disabled), the first switch 10224 is turned off and the second switch 10230 is turned on. Meanwhile, a voltage level of the compensation voltage VC on a node A is pulled down to the second voltage GND1 (that is, the ground potential of the primary side PRI of the power converter 200), so the first n-type metal-oxide-semiconductor transistor 10242 is turned off. In addition, because the inverted control signal $\bar{\phi}$ is enabled, the second n-type metal-oxide-semiconductor transistor 10244 is turned on, resulting in a voltage level on the pin 104 being pulled down to the second voltage GND1 (that is, the gate control signal GCS is disabled).

As shown in FIG. 1, when the control signal φ is enabled (the inverted control signal $\bar{\phi}$ is disabled), the first switch 10224 is turned on and the second switch 10230 is turned off, and the p-type metal-oxide-semiconductor transistor 10226 and the amplifier 10228 make the charging current IC charge the node A according to the clamping voltage VCLAMP until the voltage level of the compensation voltage VC is equal to a voltage level of the clamping voltage VCLAMP, wherein the clamping voltage VCLAMP is changed with a detection voltage VCS of a detection resistor 204 coupled to the power switch 202 accordingly. That is, when the detection voltage VCS is less than a first reference voltage, the clamping voltage VCLAMP has a first value V1, when the detection voltage VCS is between the first reference voltage and a second reference voltage, the clamping voltage VCLAMP has a second value V2, and when the detection voltage VCS is greater than the second reference voltage, the clamping voltage VCLAMP has a third value V3, wherein the first value V1 is less than the second value V2, and the second value V2 is less than the third value V3. In addition, when the control signal φ is enabled (the inverse control signal φ̄ is disabled), the first n-type metal-oxide-semiconductor transistor 10242 is turned on and the second n-type metal-oxide-semiconductor transistor 10244 is turned off, so the first n-type metal-oxide-semiconductor transistor 10242 can make the gate control signal GCS changed with the voltage level of the compensation voltage VC accordingly.

Figure 2:
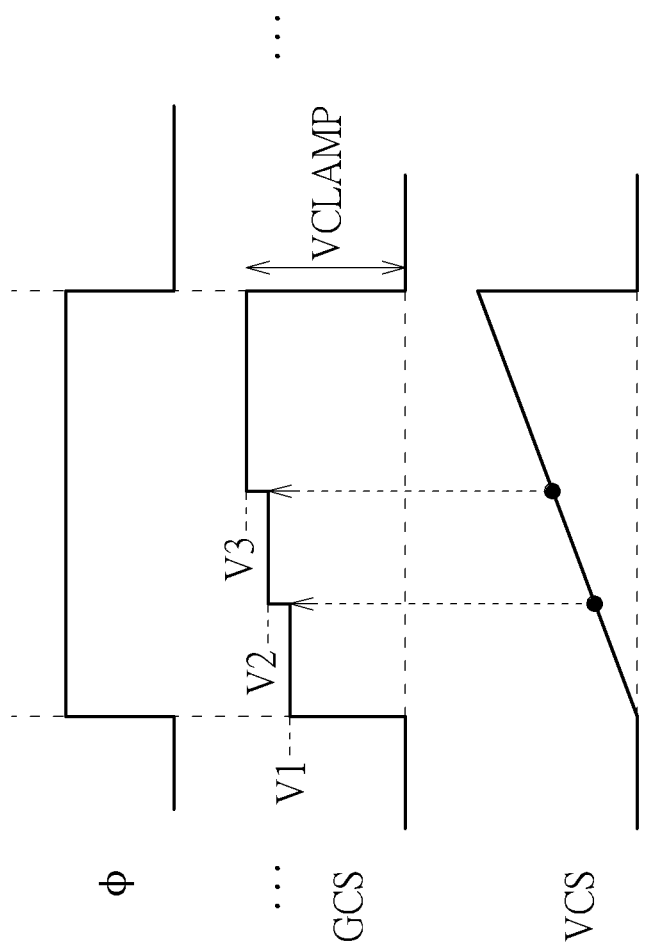
FIG. 2 is a timing diagram illustrating waveforms of the control signal, the gate control signal, and the detection voltage.

Therefore, as shown in FIG. 2, because when the control signal φ is enabled, the clamping voltage VCLAMP is changed with the detection voltage VCS on the detection resistor 204 accordingly, the voltage level of the compensation voltage VC is equal to the voltage level of the clamping voltage VCLAMP, and the gate control signal GCS is positively changed with the voltage level of the compensation voltage VC accordingly, the gate control signal GCS will be increased stepwise with increase of the detection voltage VCS. That is to say, when the detection voltage VCS is increased, a gate-source voltage of the power switch 202 is not reduced with increase of the detection voltage VCS accordingly, so the power switch 202 can still operate in the saturation region.

In addition, as shown in FIG. 1, one of ordinary skilled in the art should understand that the primary-controller 100 only shows elements related to the present invention. That is to say, the primary-controller 100 is not limited to only including the gate control signal generating circuit 102.

In addition, as shown in FIG. 1, the first voltage VCC is generated according to an auxiliary voltage VAUX on an auxiliary winding 206 of the primary side PRI of the power converter 200, and the primary-controller 100 receives the first voltage VCC through a pin 108.

Figure 3:
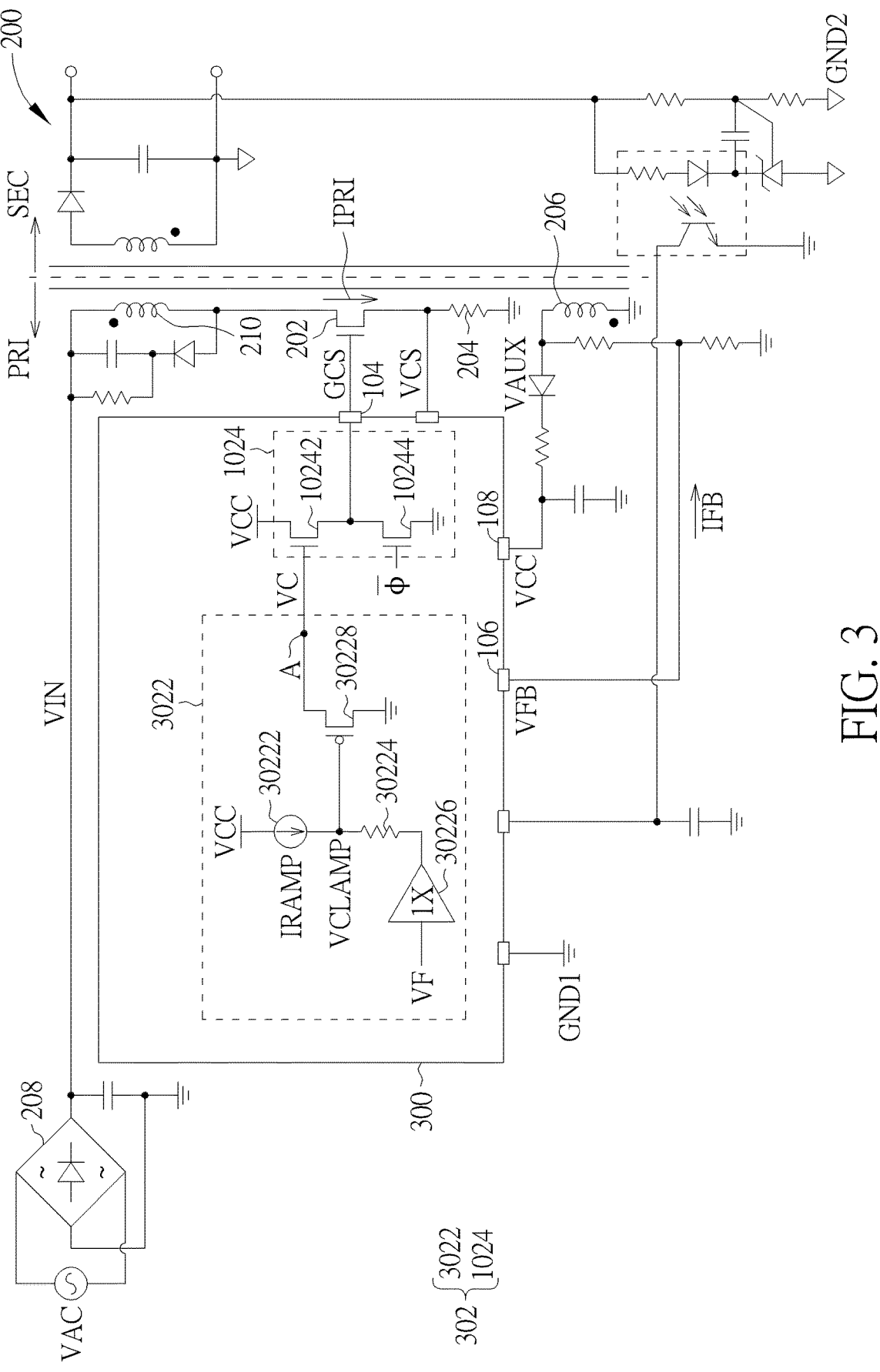
FIG. 3 is a diagram illustrating a primary-controller with a voltage compensation function according to the second embodiment of the present invention.

In addition, please refer to FIG. 3. FIG. 3 is a diagram illustrating a primary-controller 300 with a voltage compensation function according to the second embodiment of the present invention, wherein the primary-controller 300 is also applied to the primary side PRI of the power converter 200. As shown in FIG. 3, a difference between the primary-controller 300 and the primary-controller 100 is a clamping unit 3022 included in a gate control signal generating circuit 302. The clamping unit 3022 includes a variable current source 30222, a resistor 30224, an amplifier 30226, and a p-type metal-oxide-semiconductor transistor 30228. The variable current source 30222 has a first terminal and a second terminal, wherein the first terminal of the variable current source 30222 receives the first voltage VCC, and the variable current source 30222 is used for providing a variable charging current IRAMP, and the variable charging current IRAMP corresponds to the turning-on time of the power switch 202. The resistor 30224 has a first terminal and a second terminal, wherein the first terminal of the resistor 30224 is coupled to the second terminal of the variable current source 30222 and has the clamping voltage VCLAMP. The amplifier 30226 has an input terminal and an output terminal, wherein the output terminal of the amplifier 30226 is coupled to the second terminal of the resistor 30224, and the input terminal of the amplifier 30226 receives a fixed voltage VF, and the clamping voltage VCLAMP is determined by the fixed voltage VF, the variable charging current IRAMP, and the resistor 30224. The p-type metal-oxide-semiconductor transistor 30228 has a first terminal, a second terminal, and a third terminal, wherein the second terminal of p-type metal-oxide-semiconductor transistor 30228 is coupled to the first terminal of the resistor 30224, the third terminal of the p-type metal-oxide-semiconductor transistor 30228 receives the second and the p-type voltage GND1, and the p-type metal-oxide-semiconductor transistor 30228 generates the compensation voltage VC on the first terminal of the p-type metal-oxide-semiconductor transistor 30228 according to the clamping voltage VCLAMP.

Figure 4:
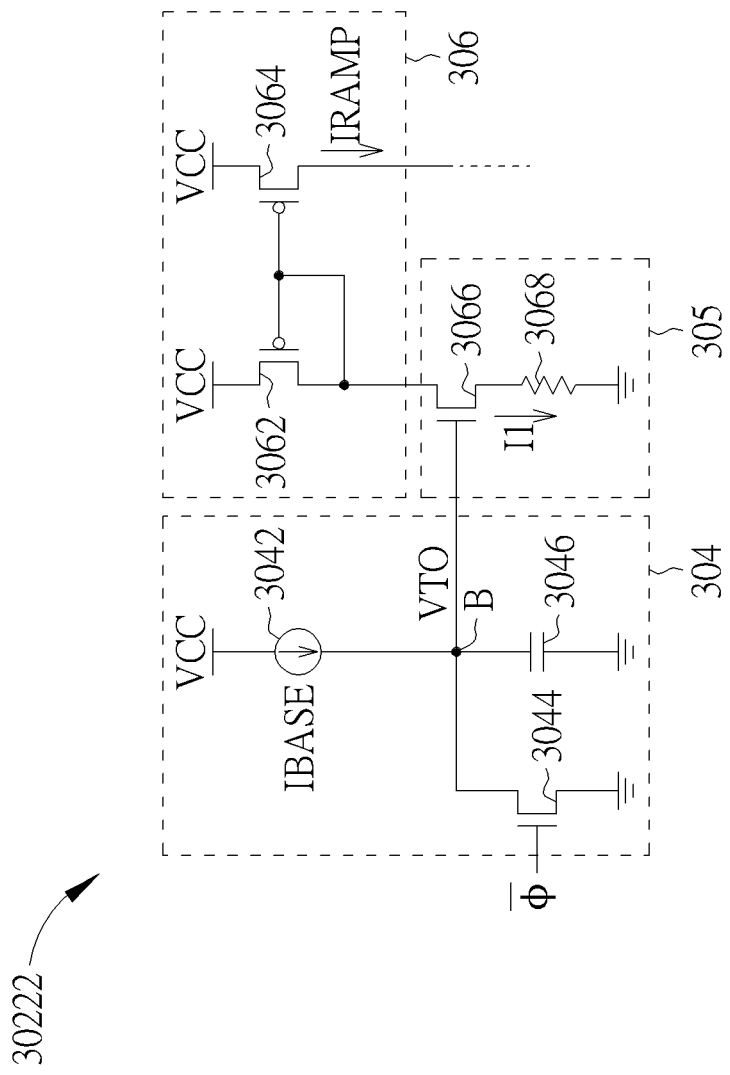
FIG. 4 is a diagram illustrating the variable current source.

In addition, as shown in FIG. 4, the variable current source 30222 includes a current-to-voltage unit 304, a voltage-to-current unit 305, and a first current mirror 306. The current-to-voltage unit 304 includes a current source 3042, an n-type metal-oxide-semiconductor transistor 3044, and a capacitor 3046, wherein coupling relationships between the current source 3042, the n-type metal-oxide-semiconductor transistor 3044, and the capacitor 3046 can be referred to FIG. 4, so further description thereof is omitted for simplicity. As shown in FIG. 4, the current-to-voltage unit 304 is used for generating a voltage VTO on a node B according to the inverted control signal φ̄ and a base current IBASE, wherein the base current IBASE is a fixed current, and the voltage VTO corresponds to the turning-on time of the power switch 202.

As shown in FIG. 4, the voltage-to-current unit 305 includes an n-type metal-oxide-semiconductor transistor 3066 and a resistor 3068, and the first current mirror 306 includes a p-type metal-oxide-semiconductor transistors 3062, 3064, wherein coupling relationships between the p-type metal-oxide-semiconductor transistors 3062, 3064, the n-type metal-oxide-semiconductor transistor 3066, and the resistor 3068 can be referred to FIG. 4, so further description thereof is omitted for simplicity. As shown in FIG. 4, the voltage-to-current unit 305 can generate a current I1 according to the voltage VTO, wherein because the voltage VTO corresponds to the turning-on time of the power switch 202, the current I1 also corresponds to the turning-on time of the power switch 202. The first current mirror 306 is used for generating the variable charging current IRAMP corresponding to the turning-on time of the power switch 202 according to the current I1, wherein one of ordinary skilled in the art should understand that the variable charging current IRAMP can be determined by equation (1):

$$IRAMP = \frac{IBASE \times dTON}{C3046 \times R3068} \times \frac{1}{K} \quad (1)$$

Figure 5:
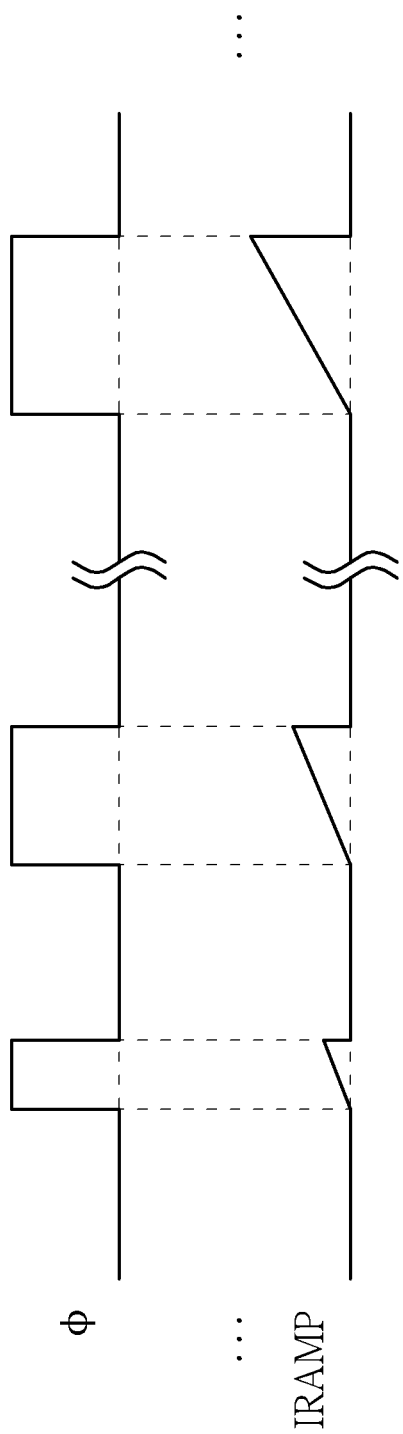
FIG. 5 is a timing diagram illustrating the variable charging current being changed positively with the turning-on time of the power switch.

As shown in equation (1), TON is the turning-on time of the power switch 202, C3046 is a capacitance of the capacitor 3046, R3068 is a resistance of the resistor 3068, and K is a scaling ratio of the first current mirror 306, wherein K can be changed according to requirements of a designer of the primary-controller 300. Because IBASE, C3046, R3068, and K are all fixed values, the variable charging current IRAMP will be changed positively with TON (as shown in FIG. 5, wherein the control signal φ corresponds to the turning-on time of the power switch 2022, so the control signal φ can be used to represent TON in FIG. 5).

Next, as shown in FIG. 3, the clamping voltage VCLAMP can be determined by equation (2):

$$VCLAMP = VF + IRAMP \times R30224 \qquad (2)$$

Figure 6:
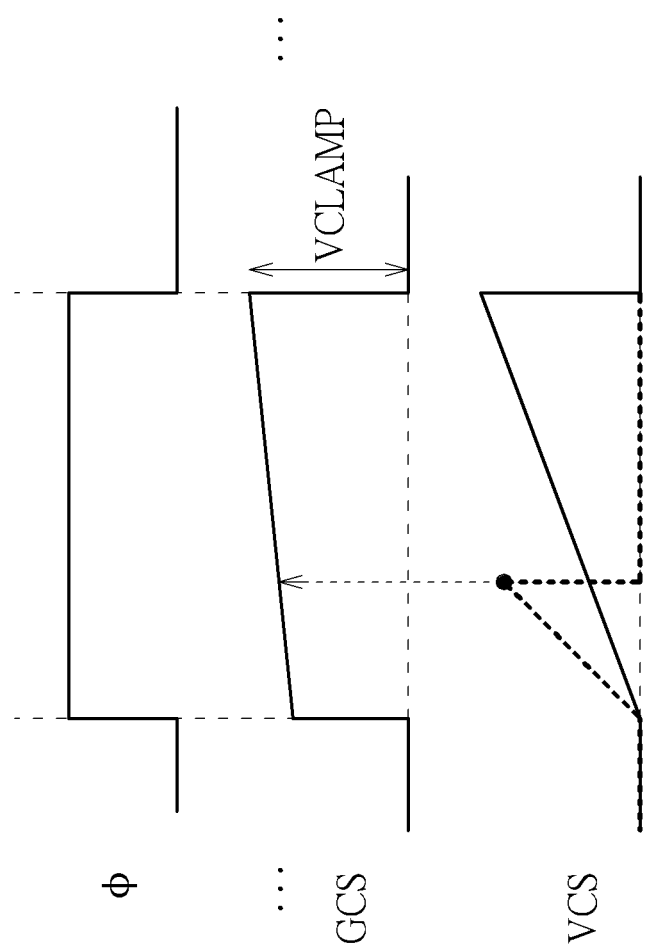
FIG. 6 is a timing diagram illustrating waveforms of the control signal, the gate control signal, and the detection voltage.

As shown in equation (2), R30224 is a resistance of the resistor 30224, wherein because the variable charging current IRAMP is changed positively with TON, the clamping voltage VCLAMP will be also positively changed with TON. In addition, as shown in FIG. 3, because the p-type metal-oxide-semiconductor transistor 30228 can make the voltage level of the compensation voltage VC equal to the voltage level of the clamping voltage VCLAMP, the compensation voltage VC will be also changed positively with TON, resulting in the gate control signal GCS being also changed positively with TON (as shown in FIG. 6). Therefore, as shown in FIG. 6, although the detection voltage VCS will be changed positively with TON (that is, the detection voltage VCS will be increased with increase of TON), the gate control signal GCS is also changed positively with increase of TON, so the gate-source voltage of the power switch 202 is not reduced with increase of TON accordingly. That is to say, the power switch 202 can still operate in the saturation region.

Figure 7:
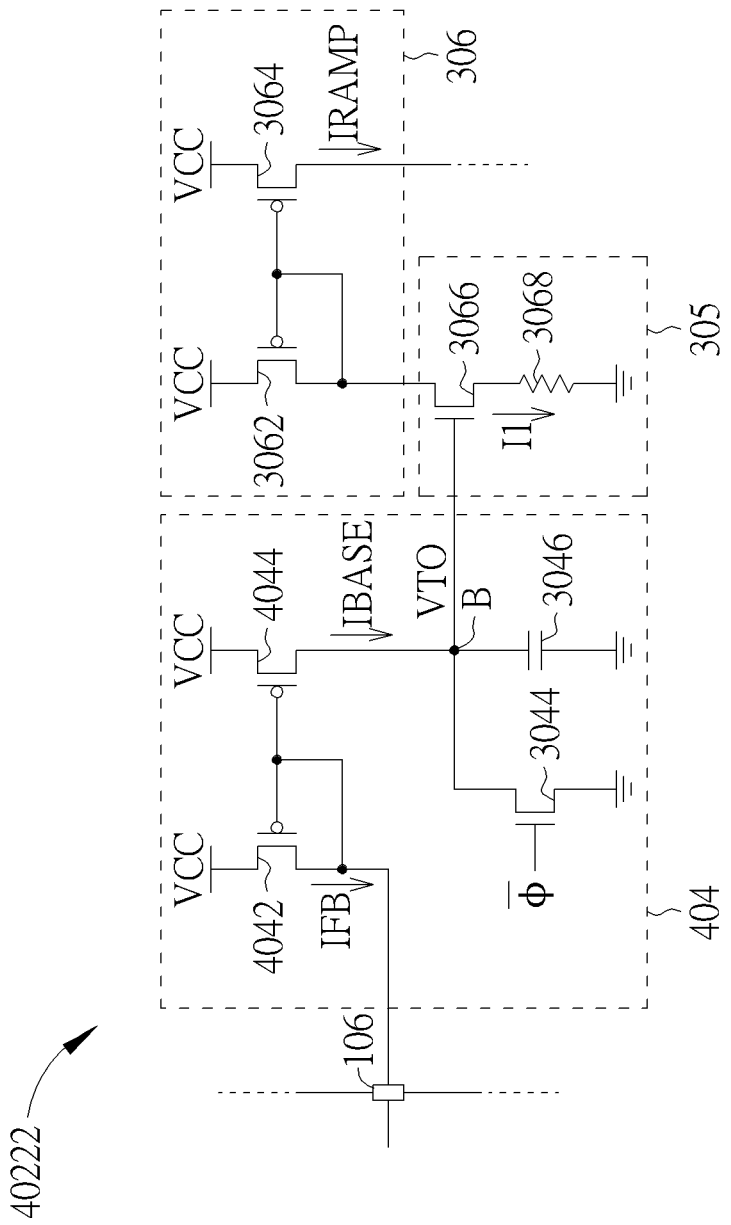
FIG. 7 is a diagram illustrating of another variable current source applied to the clamping unit according to a third embodiment of the present invention.

In addition, please refer to FIG. 7. FIG. 7 is a diagram illustrating of another variable current source 40222 applied to the clamping unit 3022 according to a third embodiment of the present invention, wherein differences between the variable current source 40222 and the variable current source 30222 are that a second current mirror (composed of p-type metal-oxide-semiconductor transistors 4022, 4024) included in a current-to-voltage unit 404 of the variable current source 40222 can generate the base current IBASE according to a feedback current IFB, and the feedback current IFB flows out the primary-controller 300 through a pin 106 (please refer to FIG. 3). As shown in FIG. 3, because the feedback current IFB corresponds to a feedback voltage VFB, and the feedback voltage VFB corresponds to the auxiliary voltage VAUX of the auxiliary winding 206 installed in the primary side PRI of the power converter 200, the current IFB obviously corresponds to a DC input voltage VIN of the primary side PRI of the power converter 200 (because the auxiliary voltage VAUX can be generated by the auxiliary winding 206, a primary winding 210 of the primary side PRI of the power converter 200, and the DC input voltage VIN), wherein the DC input voltage VIN is generated by a bridge rectifier 208 of the power converter 200 rectifying an AC voltage VAC, and one of ordinary skilled in the art should know that the feedback current IFB can be represented by equation (3):

$$IFB = \frac{VIN \times NPS}{RFB} \times \frac{1}{K} \qquad (3)$$

As shown in equation (3), RFB is a resistance on the pin 106, NPS is a turns ratio of the primary winding 210 to the auxiliary winding 206, and K is a scaling ratio of the second current mirror. Therefore, according to equation (3), it is very obvious that the feedback current IFB will be positively changed with the DC input voltage VIN. Thus, as shown in FIG. 7, because the variable current source 40222 can generate the variable charging current IRAMP according to the feedback current IFB and the inverted control signal $\bar{\phi}$, the variable charging current IRAMP will be also positively changed with the DC input voltage VIN. In addition, in another embodiment of the present invention, the scaling ratio of the second current mirror is K1, wherein K1 is different from the scaling ratio K of the first current mirror 306.

Therefore, as shown in FIG. 3 and equation (2), because the variable charging current IRAMP is positively changed with the DC input voltage VIN, the clamping voltage VCLAMP is also positively changed with the DC input voltage VIN, resulting in the compensation voltage VC being also positively changed with the DC input voltage VIN. That is, the gate control signal GCS will be also positively changed with the DC input voltage VIN.

In addition, as shown in FIG. 3, because the detection voltage VCS is determined by a primary-side current IPRI flowing through the primary side PRI of the power converter 200 and the detection resistor 204, the detection voltage VCS can be expressed by equation (4):

$$VCS = IPRI \times R204 = \frac{VIN}{L} \times dt \times R204 \qquad (4)$$

As shown in equation (4), R204 is a resistance of the detection resistor 204, and L is an inductance of the primary winding 210 of the primary PRI of the power converter 200. Therefore, According to equation (4), it is very obvious that the detection voltage VCS is also positively changed with the DC input voltage VIN.

Figure 8:
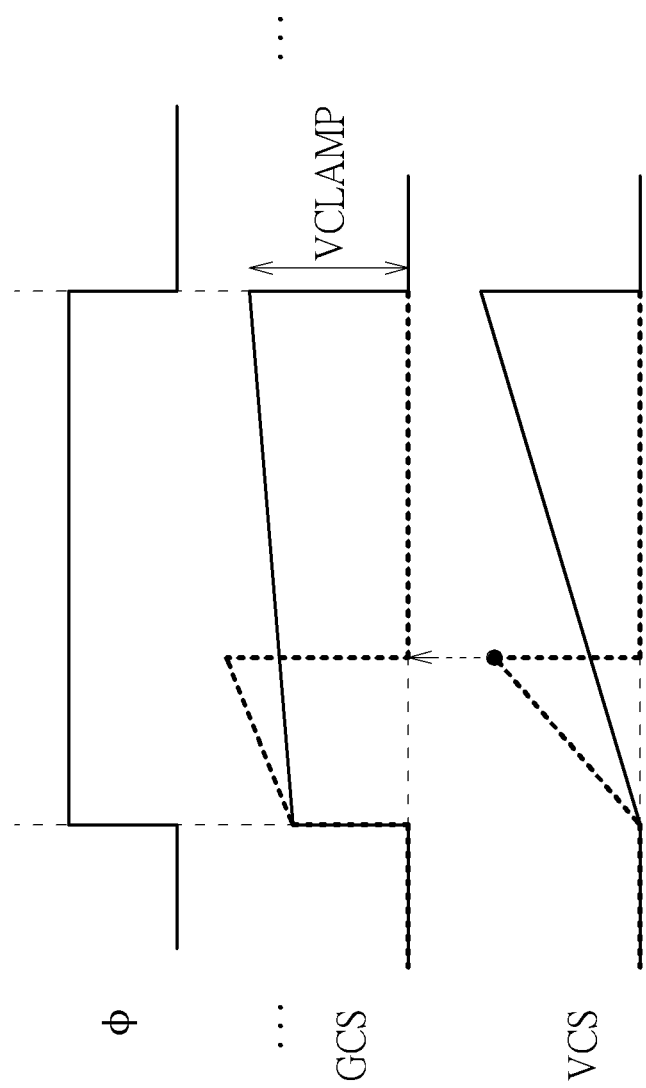
FIG. 8 is a timing diagram illustrating waveforms of the control signal, the gate control signal, and the detection voltage.

Therefore, although the detection voltage VCS is positively changed with the DC input voltage VIN (that is, the detection voltage VCS will be increased with increase of the DC input voltage VIN), the gate control signal GCS is also positively changed with the DC input voltage VIN, so the gate control signal GCS can be positively changed with the detection voltage VCS (as shown in FIG. 8). That is to say, the gate-source voltage of the power switch 202 is not reduced with increase of the detection voltage VCS accordingly, so the power switch 202 can still operate in the saturation region.

Figure 9:
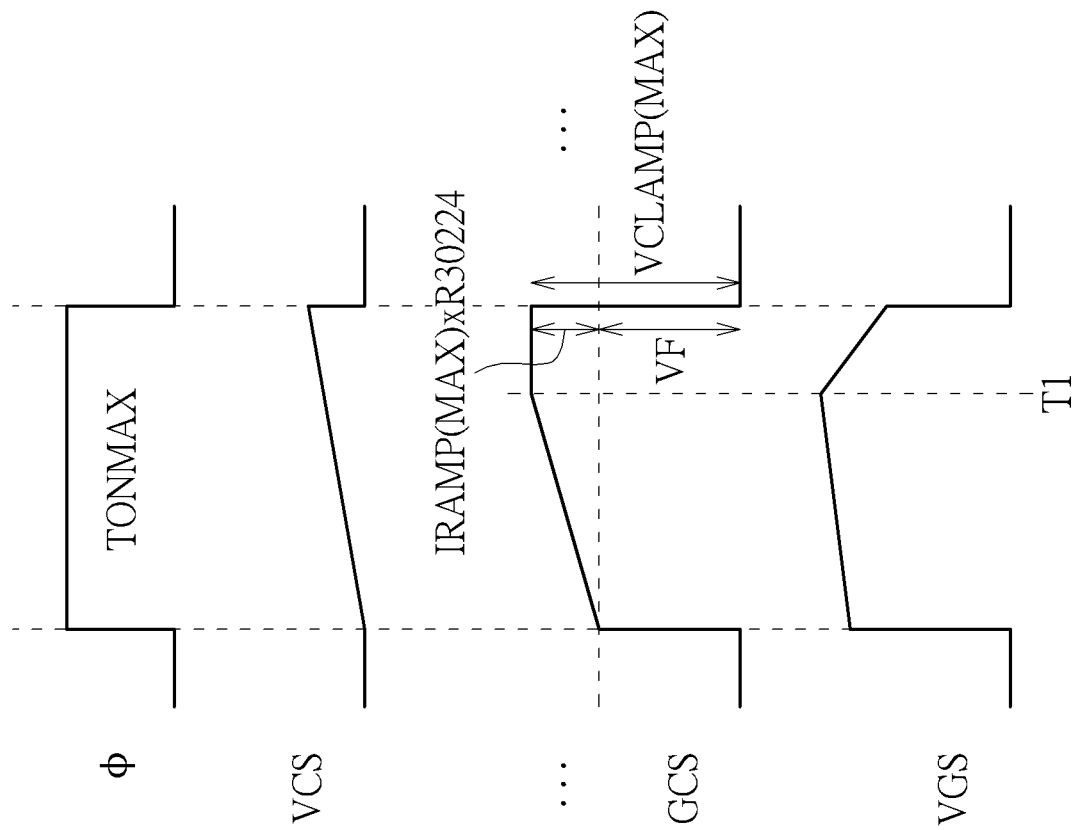
FIG. 9 is a timing diagram illustrating waveforms of the control signal, the gate control signal, the detection voltage, and the gate-source voltage of the power switch when the AC voltage is turned off.
Figure 10:
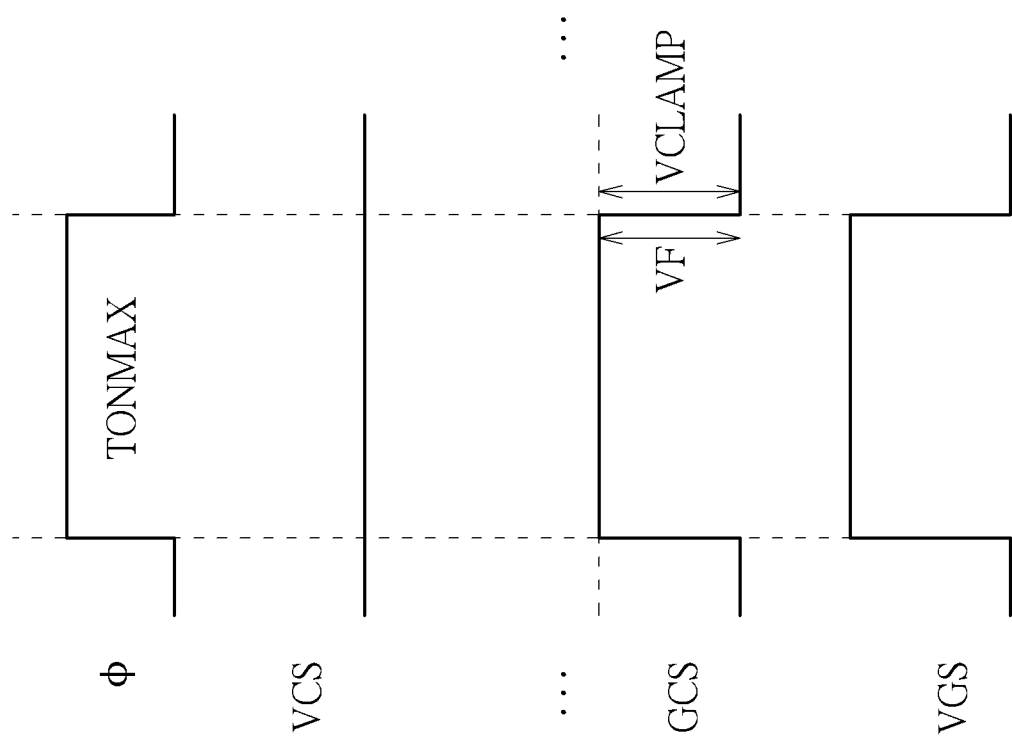
FIG. 10 is a timing diagram illustrating the waveforms of the control signal, the gate control signal, the detection voltage, and the gate source voltage of the power switch when the detection resistor is short-circuited.

Please refer to FIG. 9 and FIG. 10. FIG. 9 is a timing diagram illustrating waveforms of the control signal φ, the gate control signal GCS, the detection voltage VCS, and the gate-source voltage of the power switch 202 when the AC voltage VAC is turned off (OFF), and FIG. 10 is a timing diagram illustrating the waveforms of the control signal φ, the gate control signal GCS, the detection voltage VCS, and the gate source voltage of the power switch 202 when the detection resistor 204 is short-circuited, wherein FIG. 9 and FIG. 10 correspond to the third embodiment of the present invention. As shown in FIG. 9, when the AC voltage VAC is turned off (OFF), because the DC input voltage VIN is very small, the detection voltage VCS is increased slowly (refer to equation (4)), resulting in the control signal φ corresponding to maximum turning-on time TOMAX of the power switch 202. Thus, according to equations (1), (2), the variable charging current IRAMP will be increased continuously, so the clamping voltage VCLAMP will be also increased continuously, resulting in the voltage level of the gate control signal GCS being also increased continuously. Therefore, at a time T1, a maximum clamping voltage circuit (not shown in FIG. 3) corresponding to the primary-controller 300 (including the variable current source 40222) of the third embodiment of the present invention will limit the variable charging current IRAMP at a maximum variable charging current value IRAMP (MAX) so that the clamping voltage VCLAMP is also limited at a maximum clamping voltage VCLAMP (MAX), so the gate control signal GCS will be also limited at the maximum clamping voltage VCLAMP (MAX). In addition, according to equation (2), the maximum clamping voltage VCLAMP (MAX) can be determined by equation (5):

$$VCLAMP(MAX) = VF + IRAMP(MAX) \times R30224 \quad (5)$$

In addition, as shown in FIG. 9, after the time T1, because the detection voltage VCS is still increased slowly, but the clamping voltage VCLAMP is limited at the maximum clamping voltage VCLAMP (MAX), the gate-source voltage VGS of the power switch 202 will be gradually reduced.

In addition, as shown in FIG. 10, when the detection resistor 204 is short-circuited (for example, the detection voltage VCS is continuously lower than a predetermined value (e.g. 0.1V) for a predetermined time (e.g. 2 us)), the control signal ϕ will correspond to the maximum turning-on time TOMAX of the power switch 202. Meanwhile, a clamping voltage minimum circuit (not shown in FIG. 3) in the primary-controller 300 (including the variable current source 40222) of the third embodiment will make the variable charging current IRAMP be zero so that the clamping voltage VCLAMP is limited at the fixed voltage VF, so the gate control signal GCS is also limited at the fixed voltage VF, resulting in the gate-source voltage VGS of the power switch 202 being fixed.

Figure 11:
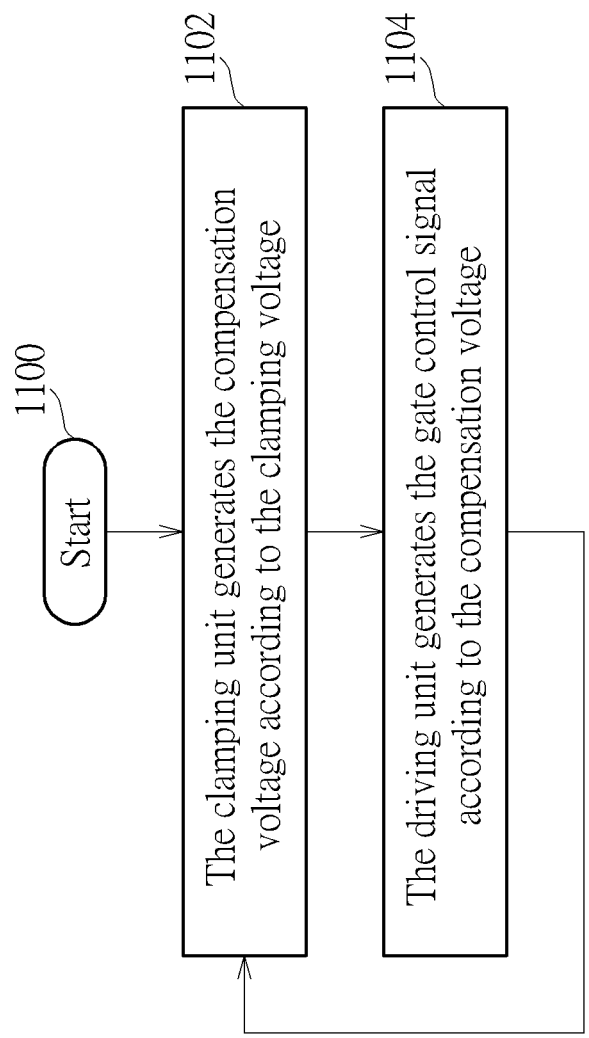
FIG. 11 is a flowchart illustrating an operational method of the primary-controller with voltage compensation function according to a fourth embodiment of the present invention.

Please refer to FIGS. 1, 2, 11. FIG. 11 is a flowchart illustrating an operational method of the primary-controller with voltage compensation function according to a fourth embodiment of the present invention. The operational method in FIG. 11 is illustrated by using the primary-controller 100 and the power converter 200 in FIG. 1. Detailed Steps are as follows:

Step 1100: Start.
Step 1102: The clamping unit 1022 generates the compensation voltage VC according to the clamping voltage VCLAMP.
Step 1104: The driving unit 1024 generates the gate control signal GCS according to the compensation voltage VC, go to Step 1102.

In Step 1102, as shown in FIG. 1, when the control signal ϕ is enabled (the inverted control signal is disabled), the first switch 10224 is turned on and the second switch 10230 is turned off, and the p-type metal-oxide-semiconductor transistor 10226 and the amplifier 10228 will make the charging current IC charge the node A according to the clamping voltage VCLAMP until the voltage level of the compensation voltage VC is equal to the voltage level of the clamping voltage VCLAMP, wherein the clamping voltage VCLAMP is changed with the detection voltage VCS of the detection resistor 204 coupled to the power switch 202 accordingly. That is, when the detection voltage VCS is less than the first reference voltage, the clamping voltage VCLAMP has the first value V1, when the detection voltage VCS is between the first reference voltage and the second reference voltage, the clamping voltage VCLAMP has the second value V2, and when the detection voltage VCS is greater than the second reference voltage, the clamping voltage VCLAMP has the third value V3, wherein the first value V1 is less than the second value V2, and the second value V2 is less than the third value V3.

In Step 1104, because when the control signal ϕ is enabled (the inverted control signal ϕ̄ is disabled), the first n-type metal-oxide-semiconductor transistor 10242 is turned on and the second n-type metal-oxide-semiconductor transistor 10244 is turned off, so the first n-type metal-oxide-semiconductor transistor 10242 can make the gate control signal GCS changed with the voltage level of the compensation voltage VC accordingly.

Therefore, as shown in FIG. 2, because when the control signal ϕ is enabled, the clamping voltage VCLAMP is changed with the detection voltage VCS on the detection resistor 204 accordingly, the voltage level of the compensation voltage VC is equal to the voltage level of the clamping voltage VCLAMP, and the gate control signal GCS is positively changed with the voltage level of the compensation voltage VC accordingly, the gate control signal GCS will be increased stepwise with increase of the detection voltage VCS. That is to say, when the detection voltage VCS is increased, the gate-source voltage of the power switch 202 is not reduced with increase of the detection voltage VCS accordingly, so the power switch 202 can still operate in the saturation region.

Figure 12:
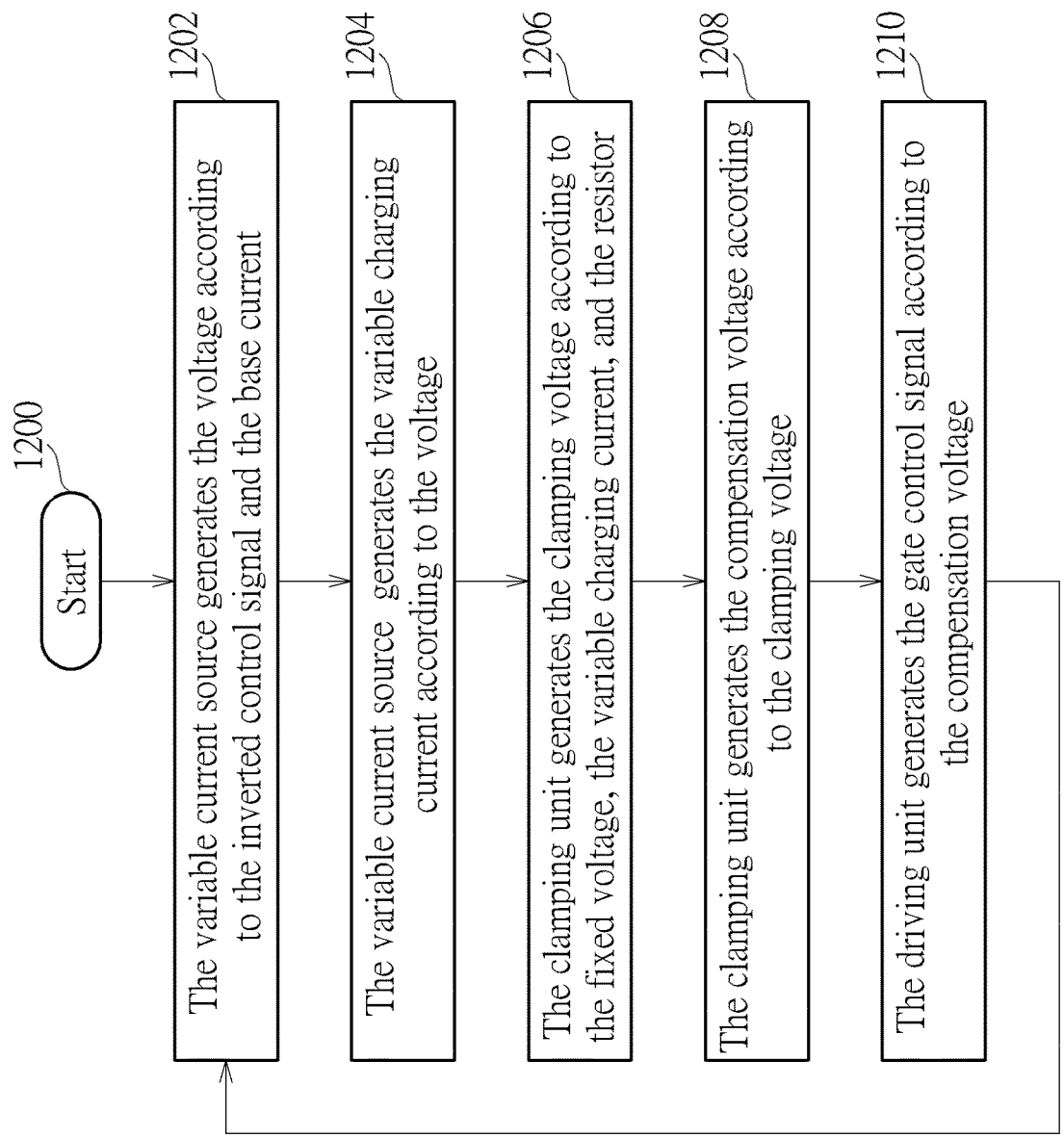
FIG. 12 is a flowchart illustrating an operational method of the primary-controller with voltage compensation function according to a fifth embodiment of the present invention.

Please refer to FIGS. 3, 4, 5, 6, 7, 8, 9, 10, 12. FIG. 12 is a flowchart illustrating an operational method of the primary-controller with voltage compensation function according to a fifth embodiment of the present invention. The operational method in FIG. 12 is illustrated by using the primary-controller 300 and the power converter 200 in FIG. 3, and the variable current source 40222 in FIG. 7. Detailed Steps are as follows:

Step 1200: Start.
Step 1202: The variable current source 30222 generates the voltage VTO according to the inverted control signal ϕ̄ and the base current IBASE, wherein the inverted control signal ϕ̄ inversely relates to the turning-on time of the power switch 202.
Step 1204: The variable current source 30222 generates the variable charging current IRAMP according to the voltage VTO.
Step 1206: The clamping unit 3022 generates the clamping voltage VCLAMP according to the fixed voltage VF, the variable charging current IRAMP, and the resistor 30224.
Step 1208: The clamping unit 3022 generates the compensation voltage VC according to the clamping voltage VCLAMP.
Step 1210: The driving unit 1024 generates the gate control signal GCS according to the compensation voltage VC, go to Step 1202.

In Step 1202, as shown in FIG. 4, the current-to-voltage unit 304 in the variable current source 30222 can generate the voltage VTO on the node B according to the inverted control signal ϕ̄ and the base current IBASE, wherein the base current IBASE is a fixed current, and the voltage VTO corresponds to the turning-on time of the power switch 202.

In Step 1204, as shown in FIG. 4, the voltage-to-current unit 305 in the variable current source 30222 can generate the current I1 according to the voltage VTO. Because the voltage VTO corresponds to the turning-on time of the power switch 202, the current I1 also corresponds to the turning-on time of the power switch 202. The first current mirror 306 in the variable current source 30222 can generate the variable charging current IRAMP corresponding to the turning-on time of the power switch 202 according to the current I1, wherein the variable charging current IRAMP will be changed positively with TON (as shown in FIG. 5).

In Step 1206 and Step 1208, because the variable charging current IRAMP is changed positively with TON, the clamping voltage VCLAMP will be also positively changed with TON. In addition, as shown in FIG. 3, because the p-type metal-oxide-semiconductor transistor 30228 can make the voltage level of the compensation voltage VC equal to the voltage level of the clamping voltage VCLAMP, the compensation voltage VC will be also positively changed with TON, resulting in the gate control signal GCS being also changed positively with TON (as shown in FIG. 6). Therefore, as shown in FIG. 6, although the detection voltage VCS is positively changed with TON (that is, the detection voltage VCS will be increased with increase of TON), the gate control signal GCS is also changed positively with increase of TON, so the gate-source voltage of the power switch 202 is not reduced with increase of TON accordingly. That is to say, the power switch 202 can still operate in the saturation region.

In addition, in another embodiment of the present invention, as shown in FIG. 7, the second current mirror (composed of the p-type metal-oxide-semiconductor transistors 4022, 4024) in the current-to-voltage unit 404 of the variable current source 40222 can generate the base current IBASE according to the feedback current IFB, wherein as shown in FIG. 3, because the feedback current IFB corresponds to the feedback voltage VFB, and the feedback voltage VFB corresponds to the auxiliary voltage VAUX of the auxiliary winding 206 installed in the auxiliary PRI of the power converter 200, the feedback current IFB obviously corresponds to the DC input voltage VIN of the primary side PRI of the power converter 200 (because the auxiliary voltage VAUX can be generated by the auxiliary winding 206, the primary winding 210 the primary side PRI of the power converter 200, and the DC input voltage VIN). In addition, according to equation (3), it is very obvious that the feedback current IFB will be positively changed with the DC input voltage VIN. Thus, as shown in FIG. 7, because the variable current source 40222 can generate the variable charging current IRAMP according to the feedback current IFB and the inverted control signal φ, the variable charging current IRAMP is also positively changed with the DC input voltage VIN.

Therefore, as shown in FIG. 3 and equation (2), because the variable charging current IRAMP is positively changed with the DC input voltage VIN, the clamping voltage VCLAMP is also positively changed with the DC input voltage VIN, resulting in the compensation voltage VC being also positively changed with the DC input voltage VIN. That is, the gate control signal GCS is also positively changed with the DC input voltage VIN.

Therefore, although the detection voltage VCS is positively changed with the DC input voltage VIN (that is, the detection voltage VCS will be increased with increase of the DC input voltage VIN), the gate control signal GCS is also positively changed with the DC input voltage, so the gate control signal GCS can be positively changed with the detection voltage VCS (as shown in FIG. 8). That is to say, the gate-source voltage of the power switch 202 is not reduced with increase of the detection voltage VCS accordingly, so the power switch 202 can still operate in the saturation region.

In summary, because the primary-controller with voltage compensation function and the operational method thereof provided by the present invention can make the voltage level of the gate control signal applied to the power switch of the primary side of the power converter changed with the detection voltage, the gate-source voltage of the power switch is not reduced with increase of the detection voltage accordingly. Therefore, compared with the prior art, when the detection voltage is changed dynamically, the power switch can still operate in the saturation region, so the conversion efficiency of the power converter will not be reduced.

Those skilled in the art will readily observe that numerous modifications and alterations of the device and method may be made while retaining the teachings of the invention. Accordingly, the above disclosure should be construed as limited only by the metes and bounds of the appterminaled claims.

What is claimed is:

1. A primary-controller with voltage compensation function, wherein the primary-controller is applied to a primary side of a power converter, the primary-controller comprising:
a gate control signal generating circuit coupled to a power switch installed in the primary side of the power converter, wherein the gate control signal generating circuit is used for enabling a gate control signal, the gate control signal is used for making the power switch turned on, and the gate control signal generation circuit comprises:
a clamping unit for generating a compensation voltage according to a clamping voltage, comprising:
a current source having a first terminal and a second terminal, wherein the first terminal of the current source receives a first voltage, and the current source is used for providing a charging current;
a first switch having a first terminal, a second terminal, and a control terminal, wherein the first terminal of the first switch is coupled to the second terminal of the current source, and the control terminal of the first switch receives a control signal, and the control signal corresponds to turning-on time of the power switch;
a p-type metal-oxide-semiconductor transistor having a first terminal, a second terminal, and a third terminal, wherein the first terminal of the p-type metal-oxide-semiconductor transistor is coupled to the second terminal of the first switch, the third terminal of the p-type metal-oxide-semiconductor transistor receives a second voltage, and the first voltage is greater than the second voltage;
an amplifier having an input terminal and an output terminal, wherein the output terminal of the amplifier is coupled to the second terminal of the p-type metal-oxide-semiconductor transistor, and the input terminal of the amplifier receives the clamping voltage; and
a second switch having a first terminal, a second terminal, and a control terminal, wherein the first terminal of the second switch is coupled to the second terminal of the first switch and the first terminal of the p-type metal-oxide-semiconductor transistor, the control terminal of the second switch receives an inverted control signal, the second terminal of the second switch receives the second voltage, and the inverted control signal and the control signal are inverted with each other; and
a driving unit coupled between the clamping unit and a gate of the power switch, wherein the driving unit is used for generating the gate control signal according to the compensation voltage, the clamping voltage is changed with a detection voltage of a detection resistor accordingly, and the detection resistor is coupled to the power switch, wherein when the detection voltage is less than a first reference voltage, the clamping voltage has a first value, when the detection voltage is between the first reference voltage and a second reference voltage, the clamping voltage has a second value, and when the detection voltage is greater than the second reference voltage, the clamping voltage has a third value, wherein the first value is less than the second value, and the second value is less than the third value.

2. A primary-controller with voltage compensation function, wherein the primary-controller is applied to a primary side of a power converter, the primary-controller comprising:
a gate control signal generating circuit coupled to a power switch installed in the primary side of the power converter, wherein the gate control signal generating circuit is used for enabling a gate control signal, the gate control signal is used for making the power switch turned on, and the gate control signal generation circuit comprises:
a clamping unit for generating a compensation voltage according to a clamping voltage, comprising:
a current source having a first terminal and a second terminal, wherein the first terminal of the current source receives a first voltage, and the current source is used for providing a charging current;
a first switch having a first terminal, a second terminal, and a control terminal, wherein the first terminal of the first switch is coupled to the second terminal of the current source, and the control terminal of the first switch receives a control signal, and the control signal corresponds to turning-on time of the power switch;
a p-type metal-oxide-semiconductor transistor having a first terminal, a second terminal, and a third terminal, wherein the first terminal of the p-type metal-oxide-semiconductor transistor is coupled to the second terminal of the first switch, the third terminal of the p-type metal-oxide-semiconductor transistor receives a second voltage, and the first voltage is greater than the second voltage;
an amplifier having an input terminal and an output terminal, wherein the output terminal of the amplifier is coupled to the second terminal of the p-type metal-oxide-semiconductor transistor, and the input terminal of the amplifier receives the clamping voltage; and
a second switch having a first terminal, a second terminal, and a control terminal, wherein the first terminal of the second switch is coupled to the second terminal of the first switch and the first terminal of the p-type metal-oxide-semiconductor transistor, the control terminal of the second switch receives an inverted control signal, the second terminal of the second switch receives the second voltage, and the inverted control signal and the control signal are inverted with each other; and
a driving unit coupled between the clamping unit and a gate of the power switch, wherein the driving unit is used for generating the gate control signal according to the compensation voltage, the clamping voltage is changed with a detection voltage of a detection resistor accordingly, and the detection resistor is coupled to the power switch, wherein the driving unit comprises:

a first n-type metal-oxide-semiconductor transistor having a first terminal, a second terminal, and a third terminal, wherein the first terminal of the first n-type metal-oxide-semiconductor transistor receives the first voltage, and the second terminal of the first n-type metal-oxide-semiconductor transistor is coupled to the clamping unit for receiving the compensation voltage, and the third terminal of the first n-type metal-oxide-semiconductor transistor is coupled to the gate of the power switch, wherein the first n-type metal-oxide-semiconductor transistor generates the gate control signal according to the compensation voltage; and
a second n-type metal-oxide-semiconductor transistor having a first terminal, a second terminal, and a third terminal, wherein the first terminal of the second n-type metal-oxide-semiconductor transistor is coupled to the third terminal of the first n-type metal-oxide-semiconductor transistor, the second terminal of the second n-type metal-oxide-semiconductor transistor receives the inverted control signal, and the third terminal of the second n-type metal-oxide-semiconductor transistor receives the second voltage.

3. A primary-controller with voltage compensation function, wherein the primary-controller is applied to a primary side of a power converter, the primary-controller comprising:
a gate control signal generating circuit coupled to a power switch installed in the primary side of the power converter, wherein the gate control signal generating circuit is used for enabling a gate control signal, the gate control signal is used for making the power switch turned on, and the gate control signal generation circuit comprises:
a clamping unit for generating a compensation voltage according to a clamping voltage, comprising:
a variable current source having a first terminal and a second terminal, wherein the first terminal of the variable current source receives a first voltage, the variable current source is used for providing a variable charging current, the variable charging current corresponds to turning-on time of the power switch, and wherein the variable current source comprises:
a current-to-voltage unit for generating a voltage according to an inverted control signal and a base current, wherein the voltage corresponds to the turning-on time of the power switch;
a voltage-to-current unit coupled to the current-to-voltage unit for generating a current according to the voltage; and
a first current mirror coupled to the voltage-to-current unit, wherein the first current mirror is used for generating the variable charging current according to the current;
a resistor having a first terminal and a second terminal, wherein the first terminal of the resistor is coupled to the second terminal of the variable current source and has the clamping voltage;
an amplifier having an input terminal and an output terminal, wherein the output terminal of the amplifier is coupled to the second terminal of the resistor, the input terminal of the amplifier receives a fixed voltage, and the clamping voltage is determined by the fixed voltage, the variable charging current, and the resistor; and a p-type metal-oxide-semiconductor transistor having a first terminal, a second terminal, and a third terminal, wherein the second terminal of the p-type metal-oxide-semiconductor transistor is coupled to the first terminal of the resistor, the third terminal of the p-type metal-oxide-semiconductor transistor receives a second voltage, and the first voltage is greater than the second voltage;

wherein the p-type metal-oxide-semiconductor transistor generates the compensation voltage on the first terminal of the p-type metal-oxide-semiconductor transistor according to the clamping voltage; and a driving unit coupled between the clamping unit and a gate of the power switch, wherein the driving unit is used for generating the gate control signal according to the compensation voltage, the clamping voltage is changed with a detection voltage of a detection resistor accordingly, and the detection resistor is coupled to the power switch.

4. The primary-controller of claim 3, wherein the driving unit comprises:

a first n-type metal-oxide-semiconductor transistor having a first terminal, a second terminal, and a third terminal, wherein the first terminal of the first n-type metal-oxide-semiconductor transistor receives the first voltage, the second terminal of the first n-type metal-oxide-semiconductor transistor is coupled to the clamping unit for receiving the compensation voltage, and the third terminal of the first n-type metal-oxide-semiconductor transistor is coupled to the gate of the power switch, wherein the first n-type metal-oxide-semiconductor transistor generates the gate control signal according to the compensation voltage; and a second n-type metal-oxide-semiconductor transistor having a first terminal, a second terminal, and a third terminal, wherein the first terminal of the second n-type metal-oxide-semiconductor transistor is coupled to the third terminal of first n-type metal-oxide-semiconductor transistor, the second terminal of the second n-type metal-oxide-semiconductor transistor receives the inverted control signal, and the third terminal of the second n-type metal-oxide-semiconductor transistor receives the second voltage.

5. The primary-controller of claim 3, wherein the base current is generated according to a feedback current, and the feedback current corresponds to a DC input voltage of the primary side of the power converter.

6. The primary-controller of claim 3, wherein the driving unit comprises:

a first n-type metal-oxide-semiconductor transistor having a first terminal, a second terminal, and a third terminal, wherein the first terminal of the first n-type metal-oxide-semiconductor transistor receives the first voltage, and the second terminal of the first n-type metal-oxide-semiconductor transistor is coupled to the clamping unit for receiving the compensation voltage, and the third terminal of the first n-type metal-oxide-semiconductor transistor is coupled to the gate of the power switch, wherein the first n-type metal-oxide-semiconductor transistor generates the gate control signal according to the compensation voltage; and a second n-type metal-oxide-semiconductor transistor having a first terminal, a second terminal, and a third terminal, wherein the first terminal of the second n-type metal-oxide-semiconductor transistor is coupled to the third terminal of first n-type metal-oxide-semiconductor transistor, the second terminal of the second n-type metal-oxide-semiconductor transistor receives the inverted control signal, and the third terminal of the second n-type metal-oxide-semiconductor transistor receives the second voltage.

7. A primary-controller with voltage compensation function, wherein the primary-controller is applied a primary side of a power converter, and the primary-controller comprising:

a gate control signal generating circuit coupled to a power switch installed in the primary side of the power converter, wherein the gate control signal generating circuit is used for enabling a gate control signal, the gate control signal is used for making the power switch turned on, and the gate control signal generation circuit comprises:

a clamping unit for generating a compensation voltage according to a clamping voltage, comprising:

a variable current source having a first terminal and a second terminal, wherein the first terminal of the variable current source receives a first voltage, the variable current source is used for providing a variable charging current, and the variable charging current corresponds to turning-on time of the power switch, wherein the variable current source comprises:

a current-to-voltage unit for generating a voltage according to an inverted control signal and a base current, wherein the voltage corresponds to the turning-on time of the power switch, and the base current is generated according to a feedback current, and the feedback current corresponds to a DC input voltage of the primary side of the power converter;

a voltage-to-current unit coupled to the current-to-voltage unit for generating a current according to the voltage; and a first current mirror coupled to the voltage-to-current unit, wherein the first current mirror is used for generating the variable charging current according to the current;

a resistor having a first terminal and a second terminal, wherein the first terminal of the resistor is coupled to the second terminal of the variable current source and has the clamping voltage;

an amplifier having an input terminal and an output terminal, wherein the output terminal of the amplifier is coupled to the second terminal of the resistor, and the input terminal of the amplifier receives a fixed voltage, and the clamping voltage is determined by the fixed voltage, the variable charging current, and the resistor; and a p-type metal-oxide-semiconductor transistor having a first terminal, a second terminal, and a third terminal, wherein the second terminal of the p-type metal-oxide-semiconductor transistor is coupled to the first terminal of the resistor, the third terminal of the p-type metal-oxide-semiconductor transistor receives a second voltage, and the first voltage is greater than the second voltage;

wherein the p-type metal-oxide-semiconductor transistor generates the compensation voltage on the first terminal of the p-type metal-oxide-semiconductor transistor according to the clamping voltage; and a driving unit coupled between the clamping unit and a gate of the power switch, wherein the driving unit is used for generating the gate control signal according to the compensation voltage, and the clamping voltage is changed with the DC input voltage of the primary side of the power converter accordingly.

8. The primary-controller of claim 7, wherein the driving unit comprises:
a first n-type metal-oxide-semiconductor transistor having a first terminal, a second terminal and a third terminal, wherein the first terminal of the first n-type metal-oxide-semiconductor transistor receives the first voltage, and the second terminal of the first n-type metal-oxide-semiconductor transistor is coupled to the clamping unit for receiving the compensation voltage, and the third terminal of the first n-type metal-oxide-semiconductor transistor is coupled to the gate of the power switch, wherein the first n-type metal-oxide-semiconductor transistor generates the gate control signal according to the compensation voltage; and
a second n-type metal-oxide-semiconductor transistor having a first terminal, a second terminal, and a third terminal, wherein the first terminal of the second n-type metal-oxide-semiconductor transistor is coupled to the third terminal of the first n-type metal-oxide-semiconductor transistor, the second terminal of the second n-type metal-oxide-semiconductor transistor receives the inverted control signal, and the third terminal of the second n-type metal-oxide-semiconductor transistor receives the second voltage.

9. An operational method of a primary-controller with voltage compensation function, wherein the primary-controller is applied to a primary side of a power converter, the primary-controller comprises a gate control signal generating circuit, and the gate control signal generating circuit comprises a clamping unit and a driving unit, wherein the clamping unit comprises a variable current source, a resistor, an amplifier and a p-type metal-oxide-semiconductor transistor, the operational method comprising:
the clamping unit generating a compensation voltage according to a clamping voltage;
the variable current source generating a voltage according to an inverted control signal and a base current, wherein the voltage corresponds to turning-on time of a power switch installed in the primary side of the power converter, and the base current is generated according to a feedback current, wherein the feedback current corresponds to a DC input voltage of the primary side of the power converter;
the variable current source generating a current according to the voltage;
the variable current source generating a variable charging current according to the current, wherein the variable charging current corresponds to the turning-on time of the power switch;
the amplifier determining the clamping voltage according to a fixed voltage, the variable charging current, and the resistor; and
the driving unit generating a gate control signal according to the compensation voltage, wherein the gate control signal is used for making the power switch turned on, the clamping voltage is changed with a detection voltage of a detection resistor accordingly, and the detection resistor is coupled to the power switch.

10. The operational method of claim 9, wherein when the detection voltage is less than a first reference voltage, the clamping voltage has a first value, when the detection voltage is between the first reference voltage and a second reference voltage, the clamping voltage has a second value, and when the detection voltage is greater than the second reference voltage, the clamping voltage has a third value, wherein the first value is less than the second value, and the second value is less than the third value.

11. An operational method of a primary-controller with voltage compensation function, wherein the primary-controller is applied to a primary side of a power converter, the primary-controller comprises a gate control signal generating circuit, and the gate control signal generating circuit comprises a clamping unit and a driving unit, wherein the clamping unit comprises a variable current source, a resistor, an amplifier and a p-type metal-oxide-semiconductor transistor, the operational method comprising:
the clamping unit generating a compensation voltage according to a clamping voltage;
the variable current source generating a voltage according to an inverted control signal and a base current, wherein the voltage corresponds to turning-on time of a power switch installed in the primary side of the power converter, and the base current is generated according to a feedback current, wherein the feedback current corresponds to a DC input voltage of the primary side of the power converter;
the variable current source generating a current according to the voltage;
the variable current source generating a variable charging current according to the current, wherein the variable charging current corresponds to the turning-on time of the power switch;
the amplifier determining the clamping voltage according to a fixed voltage, the variable charging current, and the resistor; and
the driving unit generating a gate control signal according to the compensation voltage, wherein the clamping voltage is changed with the DC input voltage of the primary side of the power converter accordingly.

* * * * *